2,901,988
MIXING APPARATUS

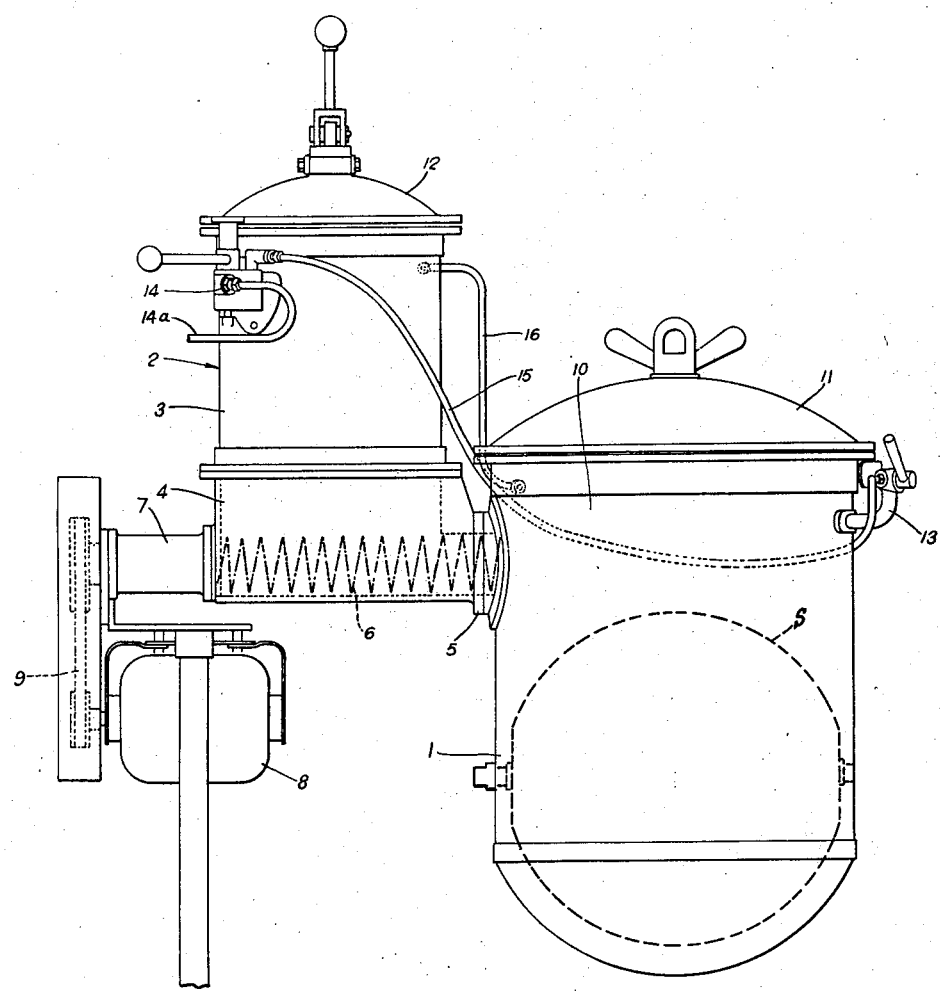

Robert Hepburn, Hamilton, Scotland, assignor to Morton Machine Company Limited, Wishaw, Scotland, a British company Application March 11, 1957, Serial No. 645,157

5 Claims. (Cl. 107—30)

This invention relates to apparatus for use in preparing a mixture, especially of solids and liquids under pressure and is especially suitable for use in preparing a mixture of the ingredients of sponges, meringues and similar confectionery.

According to the invention apparatus for use in preparing a mixture comprises a mixing chamber, an auxiliary chamber, means for feeding the contents of the auxiliary chamber to the mixing chamber and means for equalizing the pressures above the contents in the two chambers.

By way of example apparatus for use in the preparation of a mixture of confectionery ingredients will now be described in greater detail with reference to the accompanying drawing which shows such an apparatus in elevation.

The mixing chamber 1 is a whisk of a known kind and the auxiliary chamber, indicated generally by 2 comprises an upper storage section 3, and a lower feeding section 4 which may, for example, be of cast aluminium. The auxiliary chamber 2 is fixed, e.g. by welding, to the upper end of the mixing chamber 1 by means of the flange 5 projecting from and integral with the lower section 4.

The lower section 4 comprises a trough in which a screw conveyor 6 operates and the internal shape of the auxiliary chamber 2 is such that its contents fall into the trough to become fed into the mixing chamber 1 by means of the conveyor 6.

One end of the conveyor 6 extends through a channel of circular cross-section in the flange 5 into the upper end of the mixing container 1, above the level which the contents of the mixing chamber 1 will normally reach.

At the other end of the conveyor 6 the axle of the conveyor projects from the auxiliary chamber 2 through suitable sealing bearing 7, and it is connected to the driving motor 8 through the belt 9. A separate motor M is provided for driving stirrers S, of which one is shown, in the mixing chamber 1. The motor M is coupled via a clutch C, a pulley P1 a belt B, and a pulley P2 to a shaft T which is connected via a gear box G and further shaft V to the stirrers S. The motors 8 and M, the speeds of which may be variable, are automatically controlled so that the conveyor 6 and the stirrers S operate in a predetermined sequence and so that the stirrers in the mixing chamber 1 operate for a predetermined time before the screw conveyor 6 comes into operation. The contents of the auxiliary chamber 2 are thus fed to the mixing chamber 1 only after the contents of the mixing chamber 1 have been agitated for a certain period.

Each of the chambers 1 and 2 is provided with a counterbalanced lid 11 and 12 respectively, which can be clamped to allow the pressures within the chambers to be adjusted to other than atmospheric.

Pressure control equipment 13 and 14 is provided at the upper end of each of the chambers 1 and 2 respectively, above the levels which the contents of the chambers normally reach. The pressures within the chambers can be regulated through the two sets of control equipment which are connected together by a conduit 15 so that only one connection between the pressure supply and the apparatus need to be made. If the pressures in the vessels are to be increased to above atmospheric, for instance, air under pressure can be introduced into the unit 14 via a conduit 14a to be distributed to the two vessels by the pipe 15. A conduit 16 is permanently connected between the chambers 1 and 2 above the levels of the valve equipment 13 and 14 to equalize the pressures within the chambers.

A known safety device interconnecting the pressure control equipment and the means for clamping the lids, is incorporated to ensure that the lids 11 and 12 cannot be raised whilst the pressure within the chambers differs from atmospheric. Such means may for example be of the form described in the specification of U.S.A. Patent No. 1,801,101.

In use, the liquid may initially be contained in the mixing chamber and the solids, flour, etc. in the auxiliary chamber 2. The solids can be fed continuously by the conveyor 6 into the mixing chamber 1.

I claim:

1. Apparatus for use in preparing a mixture comprising a mixing chamber, an auxiliary chamber, a permanent communicating connection between said mixing chamber and said auxiliary chamber, said communicating connection being disposed at the lower end of said auxiliary chamber and the upper end of said mixing chamber, conveyor means for feeding the contents of said auxiliary chamber to said mixing chamber via said communicating connection, means for supplying a gas to said auxiliary and said mixing chambers and a conduit connection between said auxiliary and said mixing chambers to equalise the pressures above the contents of said auxiliary and said mixing chambers.

2. Apparatus according to claim 1 in which said conduit connection is constituted by a permanently open pipe.

3. Apparatus according to claim 1 which is such that the pressure above the contents of said auxiliary and said mixing chambers may be raised to above atmospheric pressure.

4. Apparatus according to claim 1 in which said conveyor means comprise a screw conveyor disposed within the lower end of said auxiliary chamber and extending through said communicating connection into said mixing chamber.

5. Apparatus according to claim 1 in which said communicating connection between said mixing chamber and said auxiliary chamber is constituted by a member projecting from and integral with said auxiliary chamber, said member being welded to said mixing chamber.

References Cited in the file of this patent

UNITED STATES PATENTS

| Re. 1,524 | Fitzgerald | Aug. 18, 1863 |
| 526,377 | Childs | Sept. 25, 1894 |
| 1,203,361 | Kohman et al. | Oct. 31, 1916 |
| 1,801,101 | Morton et al. | Apr. 14, 1931 |
| 2,640,033 | Marshall | May 26, 1953 |